2,935,546

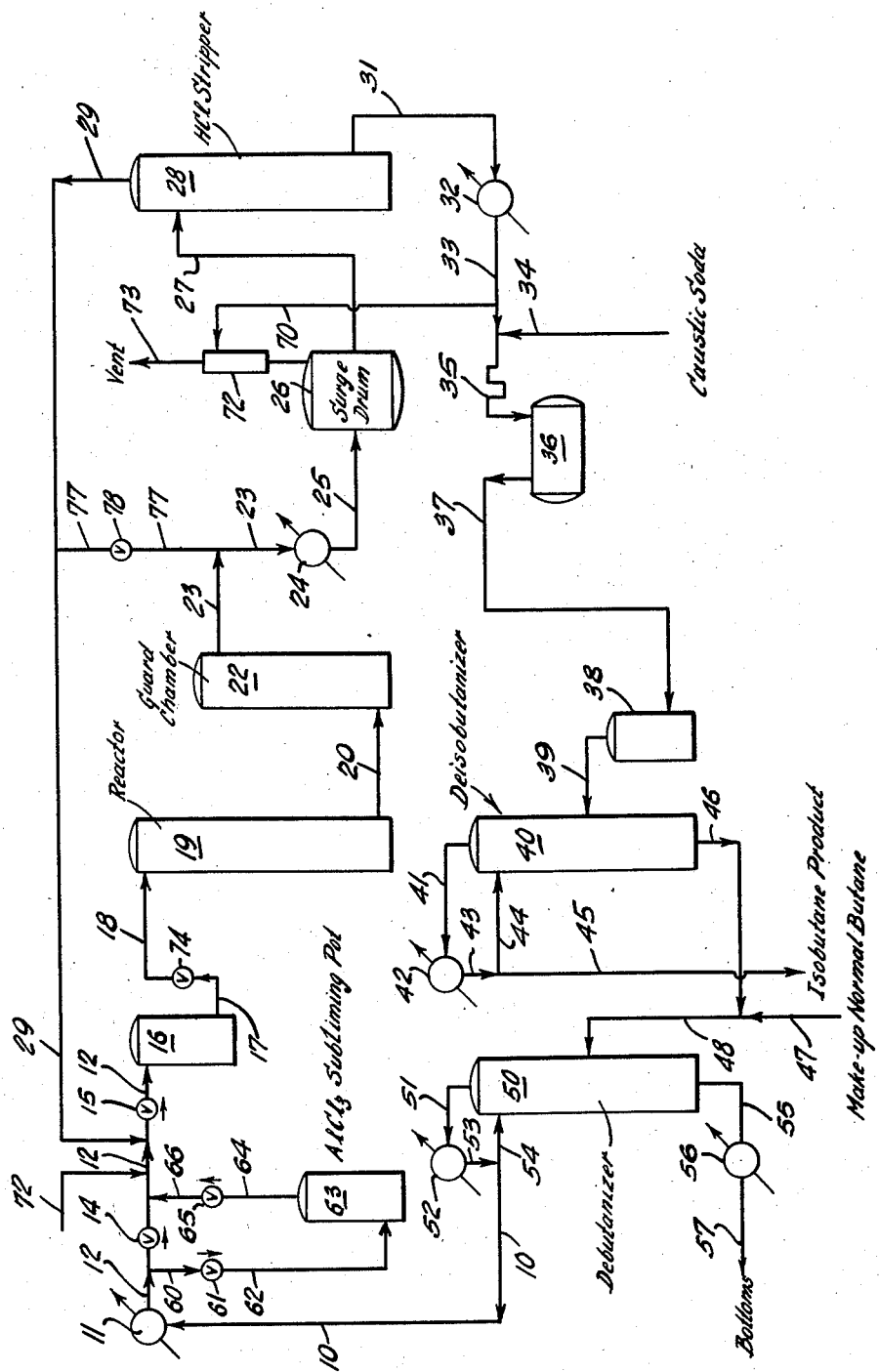

United States Patent Office

Patented May 3, 1960

2,935,546

VAPOR PHASE ISOMERIZATION PROCESS FOR NORMAL BUTANE

David K. Beavon, Darien, Conn., and Robert D. Kent, Rolling Hills, and Edward D. Wurster, Garden Grove, Calif., assignors to Texaco Inc., a corporation of Delaware Application July 7, 1958, Serial No. 746,723

6 Claims. (Cl. 260—683.75)

This invention relates to an improvement in vapor phase process for isomerizing normal butane to make isobutane.

In the vapor phase isomerization of normal butane the general practice is to pass a feed of normal butane vapor mixed with a promotional amount (1–20 mol percent and usually about 5 mol percent of the feed) of dry hydrogen chloride vapor over a fixed bed of aluminum chloride supported on dry bauxite or like base particles in a reaction zone maintained at a temperature of 220–400° F. and elevated pressure, e.g., 100–300 p.s.i.g. A fraction of the normal butane is converted into its branch chain isomer, isobutane. Normal butane and hydrogen chloride are recovered for recycling to the catalytic conversion step, while isobutane product is recovered and withdrawn from the system, usually for use in synthesizing high octane motor fuel by alkylation of olefin therewith.

The aluminum chloride catalyst adsorbed on the bauxite or similar support progressively loses activity; a tarlike deposit forms thereon. When the isobutane production at a given feed rate drops below refinery requirements, the hydrocarbon-hydrogen chloride feed temperature can be boosted (usually in small finite increments of 5–10° F.) and/or the proportion of promotional hydrogen chloride in the feed increased to maintain the amount of isomerization obtaining at least high enough for said requirements (and substantially constant, if possible). Use of the elevated temperatures, particularly those above 310° F., appears to accelerate degradation of the catalyst, perhaps by directing reaction of the hydrocarbon fed more towards cracking and tar formation than would occur at lower temperatures.

Accordingly, when the reactor temperature has reached a value of about 300° F., it becomes desirable to renew catalyst or restore old catalyst activity. In some instances the entire catalyst charge is dumped from the reactor, and the new catalyst is charged. This is usually a costly procedure. Accordingly, catalyst reactivating or "fortifying" processes have been developed and are generally resorted to.

Thus, it has been proposed to fortify by passing an inert gas such as nitrogen laden with sublimed aluminum chloride catalyst into the reaction zone whereby the fresh aluminum chloride would deposit on the old catalyst particles. During such fortification, of course, no isobutane production would be possible, and after resumption of normal production, a period of purging the inert gas and of low conversion of normal butane to isobutane would be expected.

Another technique proposed heretofore is to use the total reactor feed, that is normal butane and hydrogen halide promoter, as a vehicle for introducing fresh aluminum chloride directly to the catalyst bed. In such scheme the feed mixture is passed through a subliming chamber for aluminum chloride pick up, then into the isomerization reactor. This was shown to be impractical because an increase in tar-forming reactions during the fortification period (in the presence of the fresh aluminum chloride) tended to plug up the porous reaction zone catalyst bed prematurely. This plugging often was so serious that normal operation could be continued for only a very limited time before the pressure drop across the catalyst bed would become too high for continued operation.

It was then discovered that this frequent and rapid plugging was from the inclusion of the promotional hydrogen chloride in the vapors being admitted to the reaction zone. Accordingly, processes were developed for fortifying the catalyst with a hydrocarbon charge and sublimed aluminum chloride while withholding the introduction of promotional hydrogen chloride vapors into the reaction zone.

While such procedure is satisfactory to prevent substantial increase in tar formation during the fortification period (which ordinarily lasts from about 8–24 hours and can be even longer), only a comparatively small amount of isobutane can be produced from the normal butane feed throughout the period because a promotional proportion of HCl is not present. A typical isomerization plant will require such fortification every 5 to 20 days.

Additionally, and particularly disadvantageous from an operational standpoint with such technique, is the fact that the hydrogen chloride stripping column (for separating HCl by distillation from crude butane isomate product) has to be shut down (or its operation otherwise radically changed) for the fortification, then started up or switched back when normal operation is resumed. This is especially difficult because of the customary frequency of such fortification and the usual attendant difficulties in getting the stripper "lined out" so it operates smoothly for any situation. It usually takes a fairly long time of carefully adjusting the various controls to make the hydrogen chloride stripping operation smooth and effective, and the risk of stripper upsets during periods of major adjustment is great. Liquid phase butane can be entrained into the recycle flow to the reactor feed during stripper upsets; this usually causes accelerated fouling of the catalyst bed in the reactor or of auxiliary vessels therebefore.

Advantages of our process over foregoing ones include sustained production of isobutane in substantial proportion during the catalyst fortification period and continuous maintenance of a hydrogen chloride stripping operation throughout the fortification period as well as during the regular isomerization periods so that upset conditions attendant to shutdown and start up or similar radical manipulations of the HCl stripping operation are eliminated. Furthermore, hydrocarbon separation and recovery operations are simplified because the quality of feed thereto (i.e. the proportion of isobutane to n-butane) is not particularly radically changed if the process is changed from straight operating to fortifying conditions and back again. Broadly, our improvement in catalyst fortification in a process for the production of isobutane by vapor phase isomerization of normal butane in the presence of hydrogen chloride promoter and a catalyst of aluminum chloride deposited on a porous support in an isomerization reaction zone comprises: subliming fresh aluminum chloride in a vehicle of at least a portion of the hydrocarbon vapor feed to the process containing normal butane, blending the freshly-sublimed aluminum chloride and its hydrocarbon vehicle with the balance of said hydrocarbon vapor feed and a promotional quantity of hydrogen chloride which includes hydrogen chloride recycled from a later step of the process, passing the resulting blend at a temperature of about 250–305° F. through a porous sorbent barrier mass, thereafter passing said blend into an isomerization reaction zone, maintaining temperature in said isomerization reaction zone between about 250° and about 310° F., withdrawing the resulting crude isomate from the isomerization reaction zone, stripping hydrogen chloride from said crude isomate, and recycling the resulting stripped hydrogen chloride into admixture with said blend being fed to the porous sorbent barrier mass, thereby producing isobutane at a substantial rate throughout the fortification period.

The drawing is a flow sheet of a typical isomerization plant employing the features of the present invention. It will be discussed in detail hereinafter.

In our fortification step the interaction of hydrogen chloride, aluminum chloride, and hydrocarbon at the temperature prevailing appears to precipitate and thus to localize the formation of heavy by-products.

The porous sorbent barrier mass then acts to clean the so-treated feed. The cleaned feed is passed to the reaction zone. This barrier mass can be alumina, kaolinite, attapulgus clay, montmorillonite, fire brick, silica stone, pumice, terrana, floridine, pyrophillite, apophyllite, meerschaum, serpentine, kierserite, bentonite, a permutite, a zeolite, bauxite, magnesia, a sorptive silica, etc. Advantageously, for efficiency and economy the barrier mass is bauxite, and it is the same kind as is used for catalyst support in the isomerization reaction zone. The barrier mass can be quite small, e.g. 65 cubic feet of dry 4–8 mesh "Porocel" (bauxite) granules being suitable for use and highly effective for feed as high as about 200 barrels per hour of n-butane.

Periodically the barrier mass may become plugged, causing excessive pressure drop. Being a comparatively small unit it can be by-passed, purged, restored to flow, and put on stream in the matter of an hour or two. If the plugging is a crust, it can be broken through with a lance tool to restore flow. Otherwise the barrier mass is dumped and replaced with fresh sorbent granules. If desired, the feed can be shunted to a parallel fresh barrier mass (which represents a minor investment in equipment) during such time.

The purity of the butane feed to the operation normally will determine how long a particular barrier mass will be effective in our operation. Thus, water vapor, hydrocarbons of higher molecular weight than normal butane, and olefins tend to degenerate the barrier mass, and these impurities should be eliminated from the hydrocarbon feed to the greatest practical extent.

A suitable butane for our use will contain about 0.005% by weight water at most and preferably will have even less water. Maximum higher hydrocarbon content ($C_5+$) will be about 2% by volume and is preferably less than about 1% by volume at most. Permitting no more than 2 liquid volume percent of hydrocarbons boiling about normal butane to be fed to the reactor system minimizes tar-forming side reactions downstream of the feed vaporizer. Maximum olefin concentration (total unsats.) will be about .2% by volume and is preferably less than .1% by volume at most. Observing these feed conditions permits effective operation of a sorbent barrier mass for extended periods when using at least about .05 pound of barrier mass per pound of butane feed per hour, and advantageously at least about .1 pound per pound of butane feed per hour. Use of a substantially smaller barrier mass proportion gives too great a pressure drop in sustained operation to be practical or inadequate cleaning of the feed.

The preferred material for the barrier mass and also the catalyst base in our process is granules of 4–8 mesh "Porocel" brand bauxite, the typical gravimetric analysis of which is as follows: $Fe_2O_3$ 1%, $SiO_2$ 6.5%, $TiO_2$ 2%, CaO—MgO none, $Na_2O$ none, balance alumina, with specific surface (measured by nitrogen sorption) about 200 square meters per gram. Preceding use the bauxite in the reactor or reactors and in the guard chamber (if one is used) is advantageously treated with about 2 mol percent hydrogen chloride in a light hydrocarbon vehicle such as methane or a sweet natural gas at a temperature of 360–380° F. and under a pressure at least sufficient to force the gas through these packed vessels (about 20–30 p.s.i.g.). The HCl treatment is continued until unreacted HCl is emitted from the reaction zone (that is, the main reactor if no guard chamber is used, or the last guard chamber if one or more guard chambers are used). The bauxite of the varrier mass usually is not specially treated in this way before use, but it can be, if desired.

Also advantageously, the bauxite is dried by circulating normal butane at a temperature of 360–380° F. and a pressure 60–80 p.s.i.g. through the barrier mass, the reactor, the guard chamber if one is used, the crude isomate condenser, and the hydrogen chloride stripper, and tapping water from the system wherever it collects until virtually no more water is collected. Thereafter aluminum chloride is sublimed in butane feed and deposited on the isomerization reaction zone catalyst support to obtain, for example, 2–12% aluminum chloride concentration based on the weight of support used; preferably such aluminum chloride concentration is about 3½–7%.

The isomerization reaction is exothermic, and because of the comparatively high temperature of the feed to the barrier mass during fortification, that is 250–305° F., there is a substantial chance of the reaction accelerating to reach an even greater temperature in the isomerization reaction zone downstream with consequent fouling of the catalyst and cracking of the butane (in the presence of the freshly-sublimed aluminum chloride and promotional hydrogen chloride present). Accordingly, we have found it most efficacious to control the temperature during fortification in the isomerization reaction zone (that is the main isomerization reactor or reactors, and guard chamber or chambers if these are used) to a maximum not substantially in excess of 310° F. In other words the isomerization reaction zone is maintained broadly between about 250° F. and about 310° F. for effective isomerizing without excessive side reactions during fortification.

This is best done in our fortification by control of the exothermic temperature rise. The exothermic temperature rise through the reactor system (that is, the series of barrier mass, reactor, and guard chamber, if used) is responsive to manipulation of: the proportion of isobutane to normal butane in the hydrocarbon feed, e.g., 0–20%; the proportion of promotional HCl in the reactor feed, e.g., 1–10 mol percent; the reactor pressure, e.g., 150–300 p.s.i.g. The temperature rises in response to a rise in pressure, a rise in Hcl proportion, or a lowering of the isobutane proportion, and vice versa.

To lower the temperature of the feed blend to the barrier mass or main reaction zone during fortification substantially below about 250° F. for any substantial period of time renders the sublimation and deposition of aluminum chloride on the catalyst a much more prolonged procedure, and it also increases risk of solidification of aluminum chloride in crust-like deposits in various places in the system. Conversely, to supply the feed blend to the barrier mass at a temperature substantially above about 305° F. makes it very difficult to maintain the 310° F. limitation in the reaction zone.

Reference is made to the drawing for the following examples of commercial operation of our process. For clarity only major equipment items are illustrated. Instruments, most valves, pumps, and reboilers are not shown, but are supplied where needed. All flows given are in terms of 42 gallon barrels of liquid per hour whether or not they are in vapor or in liquid condition, except when the flow referred to is in terms of standard cubic feet per hour. The standard conditions herein are 60° F. and 1 atmosphere total pressure. Maximum temperature permitted in the guard chamber outlet line (item 23 of the drawing) is set at 310° F. in the operating periods hereinafter described. In the following examples the butane feed contains a small fraction of isobutane and only inconsequential amounts of olefins, water, and C₅ and higher boiling hydrocarbons.

*Example 1.*—Butane feed, being obtained from a fractional distillation operation hereinafter described, passes through line 10 into vaporizer 11 at the rate of 150 b.p.h. It is the eighth hour after fortification has been initiated. The feed emerges from the vaporizer at 230 p.s.i.g. and 294° F., and it passes into header 12. A sidestream of 42 b.p.h. of these vapors is shunted through an aluminum chloride subliming drum 63 by means of line 60, valve 61, and inlet 62. The balance of the vaporizer output continues through header 12 and valves 14 and 15.

Butane vapors containing sublimed aluminum chloride emerge from drum 63, line 64, valve 65, and line 66 to discharge into header 12, together with a recycle flow of HCl-hydrocarbon vapor mixture (from the top of HCl stripper 28) which enters header 12 through line 29. The HCl stripper overhead vapors amount to 18,300 s.c.f.h. and are sufficient to give an HCl concentration in the vapors passing through valve 15 and into the reactor system of 1.7 mol percent. The combined vapor stream at a temperature of 282° F. enters vessel 16 packed with a barrier mass of 65 cubic feet of 4–8 mesh Porocel brand bauxite, then is withrawn through outlet 17 and valve 74. Pressure (drop) through the bed of barrier mass is from 225 p.s.i.g. to 195 p.s.i.g. The so-treated vapors containing aluminum chloride continue through line 18 and into reactor 19 at 288° F. The reactor is filled with 1,110 cubic feet of used catalyst which contains aluminum chloride on 4–8 mesh Porocel brand bauxite. Fresh aluminum chloride deposits on the used catalyst to reactivate it for isomerization at an increased rate.

Vapors are withdrawn from reactor 19 through outlet 20 at a pressure of 195 p.s.i.g. and a temperature of 297° F. with substantial isomerization of the normal butane to isobutane in the vapor mixture. The vapor mixture then passes into guard chamber 22, containing 390 cubic feet of 4–8 mesh Porocel brand bauxite, the guard chamber serving to prevent substantial loss of aluminum chloride to locations downstream in the system.

Guard chamber vapors are withdrawn through line 23 at a pressure of 190 p.s.i.g. and a temperature of 293° F. These vapors continue into isomate condenser 24 and emerge therefrom as liquid at an average temperature of 93° F. The liquid isomate passes through line 25 into surge drum 26, and from there is fed into the HCl stripper 28, through line 27. During the fortification period the liquid level in the surge drum is permitted to build up for accumulating an inventory of HCl in butane solution to be used in regular isomerizing after fortification. Pressure in the surge drum is 188 p.s.i.g. Vapors are vented intermittently therefrom through condenser 72 and line 73 in the amount of 125 s.c.f.h. These vapors are scrubbed in vent scrubber 72 by a stream of 7 b.p.h. of recycled HCl stripper bottoms from line 70.

HCl stripper 28 is operated continuously during both the fortification and the regular isomerizing periods so that the operation is smooth and without upset. The feed to the stripper from the surge drum is 149 b.p.h. Overhead vapors from the stripper pass through line 29 at 285 p.s.i.g. and 109° F. The stripper bottom temperature is 234° F. Bottoms are withdrawn through line 31 and cooler 32, then discharged through line 33 and mixed in mixer 35 with neutralizing aqueous caustic soda entering through line 34. The resulting mixture passes into caustic settler 36. Caustic soda is made up, purged, and recycled by means not shown. Neutralized stripper bottoms are withdrawn from the settler through line 37.

The neutralized hydrocarbons pass into salt saturator 38. Additional water separates from the hydrocarbon here and is withdrawn by means not shown. The so-dried hydrocarbon enters deisobutanizer 40, a conventional fractional distillation tower, through saturator discharge line 39. Tower 40 operates at a top pressure of 119 p.s.i.g., a top temperature of 140° F., a bottom pressure of 123 p.s.i.g., and a bottom temperature of 175° F. Overhead vapors from the deisobutanizer pass through line 41 into condenser 42 and outlet 43 and are then sent to reflux through line 44 and to production through line 45. During the fortification period 48 b.p.h. of isobutane production is withdrawn through line 45, this amounting to approximately two-thirds of the isobutane production obtained in a regular isomerizing period. It indicates a drop of only about one-fourth in the isomerizing rate from the regular period.

The bottoms from deisobutanizer 40, 104 b.p.h., pass through line 46 and mix with make-up butane entering the system through line 47 at the rate of 67 b.p.h. This mixture enters debutanizer 50 through line 48. The debutanizer is operated at a pressure of 75 p.s.i.g. and an overhead distillate temperature of 130° F. Vapors from the debutanizer pass through line 51 into condenser 52, then to outlet 53. A portion of the resulting condensate is refluxed to the debutanizer through line 54, and the balance is fed into feed heater 11 through line 10 as hereinbefore described. A bottoms fraction is withdrawn from the debutanizer through line 55, cooler 56 and line 57 at the rate of 19 b.p.h., this bottoms fraction being C₅ and higher boiling hydrocarbons. In substantially the foregoing manner the fortification is continued until about 14 hours have elapsed whereby 3 drums (about 1680 lbs.) of aluminum chloride is sublimed from pot 63.

*Example 2.*—The following data is representative of the plant operation at 226 hours after termination of the fortification period described in Example 1. In this operation the butane feed from the debutanizer overhead enters vaporizer 11 through line 10 at a rate of 160 b.p.h. It is discharged as vapor from the vaporizer at 288 p.s.i.g. and 304° F. A slipstream of this vapor, 33 b.p.h., passes through line 60, valve 61, and line 62 into aluminum chloride sublimation pot 63 to assist in sustaining catalytic activity in the vessels downstream. HCl stripper vapors from tower 28 enter header 12 through line 29 at 31,000 s.c.f.h., this amount being sufficient to maintain the HCl content of the mixed vapors in header 12 passing through valve 15 at 6.9 mol percent. Makeup HCl can be fed into the system intermittently through line 72 as is necessary to maintain desired HCl inventory.

The mixed vapors then pass through the barrier mass in vessel 16, out line 17, through valve 74 and line 18, and into reactor 19. The vapors pass through reactor 19 and are withdrawn through line 20, then through guard chamber 22 and out line 23. Pressure at the inlet of vessel 16 is 282 p.s.i.g., and the temperature is 283° F. Pressure at the inlet of the reactor is 256 p.s.i.g., and the temperature is 274° F. Pressure at the inlet of the guard chamber is 251 p.s.i.g., and the temperature is 300° F. The material discharged from the guard is at 244 p.s.i.g. and 302° F.

The vapors discharged from the guard chamber are condensed in condenser 24 to an average liquid temperature of 93° F. Line 77 and valve 78 are provided to bypass stripper overhead vapors directly to the isomate condenser 24, if desihred. Valve 78 is shut off in the instance herein described.

The crude condensed isomate passes into surge drum 26, which is maintained at a pressure of 244 p.s.i.g. Vent gas is emitted from the surge drum through vent scrubber 72 and line 73 intermittently at the average rate of 125 s.c.f.h. The vent is scrubbed with 3.8 b.p.h. of cooled stripper bottoms as described in Example 1.

Feed to the stripper is withdrawn from the surge drum at 167 b.p.h., the stripper top being at 285 p.s.i.g. and 10° F. and the stripper bottom being 231° F. Stripper overhead vapors pass through line 29 as hereinbefore desribed. Stripper bottoms pass through line 31, cooler 32, line 33, and are washed with caustic soda solution in mixer 35 as described in Example 1.

Neutralized stripper bottoms are withdrawn from caustic settler 36 by means of line 37, dried in salt saturator 38, and passed through line 39 into deisobutanizer 40. The deisobutanizing fractional distillation is operated with a top pressure of 119 p.s.i.g. and a top temperature of 141° F. The bottom temperature is 179° F., and the bottom pressure is 119 p.s.i.g. Overhead vapors pass through line 41, condenser 42 and line 43. A portion of the resulting condensate is refluxed through line 44 to tower 40, and the balance is withdrawn through line 45 as isobutane product at the rate of 71 b.p.h.

The bottoms from the deisobutanizer, 93 b.p.h., pass through line 46, and are mixed with make-up butane entering line 47 at the rate of 105 b.p.h. This mixed material passes through line 48 into debutanizer 50.

The debutanizing fractional distillation is operated in conventional manner with an overhead distillate temperature of 130° F. at 75 p.s.i.g. The distillate overhead vapors pass through line 51 and condenser 52 and discharges as liquid through line 53, a portion being refluxed to the tower through line 54 and the balance, 160 b.p.h., being delivered in line 10 to vaporizer 11 as hereinbefore described. A bottoms fraction is withdrawn from tower 50 through line 55 at the rate of 38 b.p.h., cooled in cooler 56 and withdrawn through line 57, this fraction being $C_5$ and higher boiling hydrocarbons.

A preferred and effective procedure for initiating fortification of the isomerization catalyst with aluminum chloride (described in reference to the apparatus used in the foregoing examples) involves: (1) raising the isobutane content of the vaporizer charge to roughly 3–10%, which reduces conversion of isobutane to butane and minimizes exothermic temperature rise; (2) decreasing the promotional HCl concentration in the reactor feed to 1–5% from a higher value (if a higher value is being used) which has a similar effect; (3) decreasing the pressure on the reactor system (that is, the series of barrier mass, the reactor, and the guard chamber) from 250–300 p.s.i.g. or higher to about 180–190 p.s.i.g., this also having the same effect; and (4) increasing the butane feed temperature sufficiently, e.g. 280–290° F. to obtain a main reactor outlet temperature of 300–306° F., thus insuring no butane condensation in the system; (5) start a slipstream of 20–30% of the hydrocarbon from the vaporizer through the aluminum chloride sublimation pot. Ordinarily only a portion of the hydrocarbon feed from the feed vaporizer need be used to pick up aluminum chloride for the fortification, e.g. 10-50% of such feed, but more or even all the hydrocarbon feed can be used for this purpose if desired. It should be kept in mind that operating conditions during fortification and normal isomerizing periods are usually incrementally changed in order to sustain a desired average production rate, this in part being done to compensate for the movement of the aluminum chloride in the reactor system by sublimation to downstream points.

From the foregoing examples it is evident that fortification can be done sucessfully with a widely varying concentration of promotional HCl in the butane feed, and, if desired in some instances, without substantially changing the promotional HCl concentration from normal operation. Furthermore, the fortification can be made smoothly and effectively continuous or semi-continuous with sustained high catalytic activity for isomerizing because the rate of HCl being added downstream of the aluminum chloride subliming pot need not be changed radically at any time with attendant upset to the HCl stripping operation.

We claim:

1. In a process for the production of isobutane by vapor phase isomerization of normal butane in the presence of hydrogen chloride promoter and a catalyst of aluminum chloride deposited on a porous support in an isomerization reaction zone, the improvement for catalyst fortification which comprises: subliming fresh aluminum chloride in a vehicle of at least a portion of the hydrocarbon vapor feed to the process containing normal butane, blending the freshly-sublimed aluminum chloride and its hydrocarbon vehicle with the balance of said hydrocarbon vapor feed and a promotional quantity of hydrogen chloride which includes hydrogen chloride recycled from a later step of the process, passing the resulting blend at a temperature of about 250–305° F. through a porous sorbent barrier mass, thereafter passing said blend into an isomerization reaction zone, maintaining temperature in said isomerization reaction zone between about 250° and about 310° F., withdrawing the resulting crude isomate from the isomerization reaction zone, stripping hydrogen chloride from said crude isomate, and recycling the resulting stripped hydrogen chloride into admixture with said blend being fed to the porous sorbent barrier mass, thereby producing isobutane at a substantial rate throughout the fortification period.

2. The process of claim 1 wherein the porous sorbent barrier mass amounts to at least about 0.05 pound per pound of hydrocarbon per hour fed therethrough.

3. The process of claim 1 wherein the fortification is intermittent.

4. The process of claim 1 wherein the fortification is continuous.

5. The process of claim 1 wherein said hydrocarbon vapor feed contains from about 0–20 volume percent isobutane during fortification.

6. The process of claim 1 wherein said proportion of promotional hydrogen chloride is between about 1 and about 10 mol percent of said vapor feed to the barrier mass.

References Cited in the file of this patent

UNITED STATES PATENTS

| | | |
|---|---|---|
| 2,407,488 | Franklin | Sept. 10, 1946 |
| 2,429,125 | Gerbes | Oct. 14, 1947 |